US006575155B2

(12) United States Patent
Brennan

(10) Patent No.: US 6,575,155 B2
(45) Date of Patent: Jun. 10, 2003

(54) PORTABLE GRILL AND COOLER APPARATUS

(76) Inventor: Daniel A. Brennan, 6067 Terra La., McCordsville, IN (US) 46055

(*) Notice: Subject to any disclaimer, the term of this patent is extended or adjusted under 35 U.S.C. 154(b) by 0 days.

(21) Appl. No.: 09/976,623

(22) Filed: Oct. 12, 2001

(65) Prior Publication Data

US 2002/0043259 A1 Apr. 18, 2002

Related U.S. Application Data

(60) Provisional application No. 60/240,430, filed on Oct. 13, 2000.

(51) Int. Cl.[7] .......................... F24C 3/00; B62D 53/00; B60R 9/00

(52) U.S. Cl. ...................... 126/41 R; 126/276; 99/449; 280/406.2; 280/407; 224/519

(58) Field of Search ............................ 126/41 R, 25 R, 126/276, 266; 99/449; 280/406.2, 407, 497; 224/519, 521

(56) References Cited

U.S. PATENT DOCUMENTS 2,608,191 A * 8/1952 Schmidt et al. ........... 126/15 R
4,089,554 A * 5/1978 Myers ........................ 224/498
4,744,590 A * 5/1988 Chesney ..................... 224/520
5,184,840 A * 2/1993 Edwards ..................... 280/507
5,224,636 A * 7/1993 Bounds ....................... 224/281
5,443,189 A * 8/1995 Hirschfeld .................. 224/282
5,640,949 A * 6/1997 Smith ........................ 126/25 R
5,749,697 A * 5/1998 Davis ......................... 414/680
5,927,745 A * 7/1999 Cunningham ............... 108/118
6,168,058 B1 * 1/2001 Janek ......................... 220/9.2
6,260,752 B1 * 7/2001 Dollesin ..................... 224/495
D449,269 S * 10/2001 Gower ....................... D12/406
6,305,705 B1 * 10/2001 Cook ...................... 280/455.1
6,398,290 B1 * 6/2002 Williams et al. ............ 224/509

FOREIGN PATENT DOCUMENTS

DE 3543429 A1 * 6/1987 ............. B60P/1/02

* cited by examiner

*Primary Examiner*—Henry Bennett
*Assistant Examiner*—Kathryn Ferko
(74) *Attorney, Agent, or Firm*—Bingham McHale LLP; C. John Brannon

(57) ABSTRACT

A raisable and lowerable platform that houses a removable charcoal or gas grill and a removable cooler chest, with a storage compartment between the two, a telescoping flag-pole mounted to the platform to display team colors, and a fold down table attached on both ends of the platform to provide more cooking area. In the preferred embodiment to date the platform is connected to a wheeled scissors lift system that is used to raise and lower the platform. The apparatus is carried and transported via a rollered receiver hitch assembly that is an integral part of the scissors lift system and that is conventionally mountable on a transport vehicle.

18 Claims, 5 Drawing Sheets

10 20 22 24 26 26 28 15 38 38 30 34 14 16 16

PORTABLE GRILL AND COOLER APPARATUS

This application claims the benefit of co-pending U.S. Provisional Patent Application Ser. No. 60/240,430, filed Oct. 13, 2000.

BACKGROUND OF THE INVENTION

Avid football fans and pre-game tailgaters have recognized the need for a device that would alleviate the principal problems associated with tailgating: not having enough space to transport all of one's tailgating equipment and supplies, i.e. a grill, a cooler chest, food, team flag and flag pole; and once at the tailgating site, not having enough room to set up the grill and cooler chest. The portable grill and cooler apparatus of the present invention solves these vexing problems now existing in the tailgating art.

SUMMARY OF THE INVENTION

The portable grill and cooler apparatus of the present invention contains everything a person would need to put on a tailgating party. It is an all-in-one tailgating package, and in a preferred embodiment to date, consists of a raisable and lowerable platform that houses a removable charcoal or gas grill and a removable cooler chest, with a storage compartment between the two, a telescoping flagpole mounted to the platform to display team colors, and a fold down table attached on both ends of the platform to provide more cooking area. In the preferred embodiment to date, the platform is connected to a scissors lift system that is used to raise and lower the platform. The apparatus is carried and transported solely via a receiver type hitch assembly one part of which is an integral part of the scissors lift system and one part of which is conventionally mountable on a transport vehicle. The scissors lift system can be used to mount the apparatus to a transport vehicle without the need to physically lift the apparatus. On the bottom of the scissors lift system of the preferred embodiment to date are four caster wheels. Thus, when detached from the transport vehicle, the apparatus can be easily moved, utilizing the caster wheels, again without physical lifting. The castor wheels are not used in the transport of the apparatus by a transport vehicle. The ability to carry and move the apparatus without having to physically lift the apparatus at any time is thus unique.

Another preferred embodiment of the present invention to date has been a portable grill and cooler apparatus, comprising a platform housing a grill and a cooler chest; a lift device attached to the platform that raises the platform from a transport position to a use position and lowers the platform from the use position to the transport position, and that removably attaches the platform to a transport vehicle; and wheels attached to the lift device on which the platform and lift means are wheeled when the platform and lift means are detached from a transport vehicle but on which they are not wheeled when the platform is in the transport position and is attached to a transport vehicle.

Related objects and advantages of the present invention will be evident from the following descriptions.

BRIEF DESCRIPTION OF THE DRAWING FIGURES

DETAILED DESCRIPTION OF THE PREFERRED EMBODIMENTS

Figure 2:
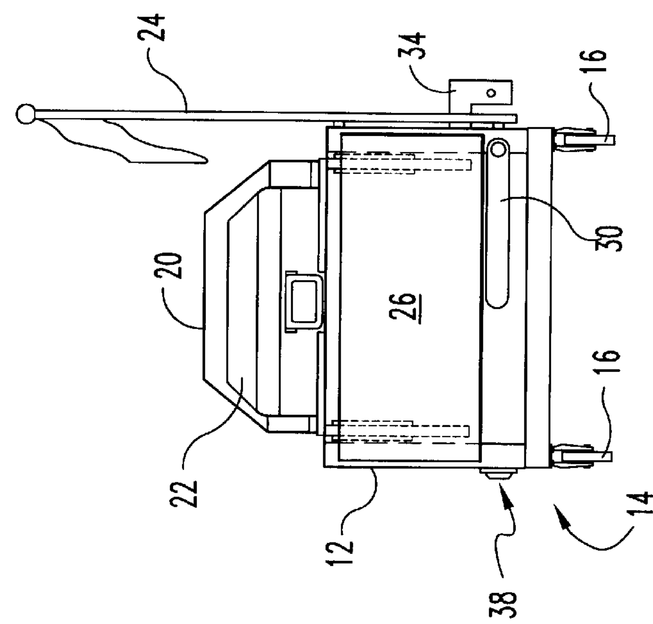
FIG. 2 is a right side view of the apparatus of FIG. 1.
Figure 3:
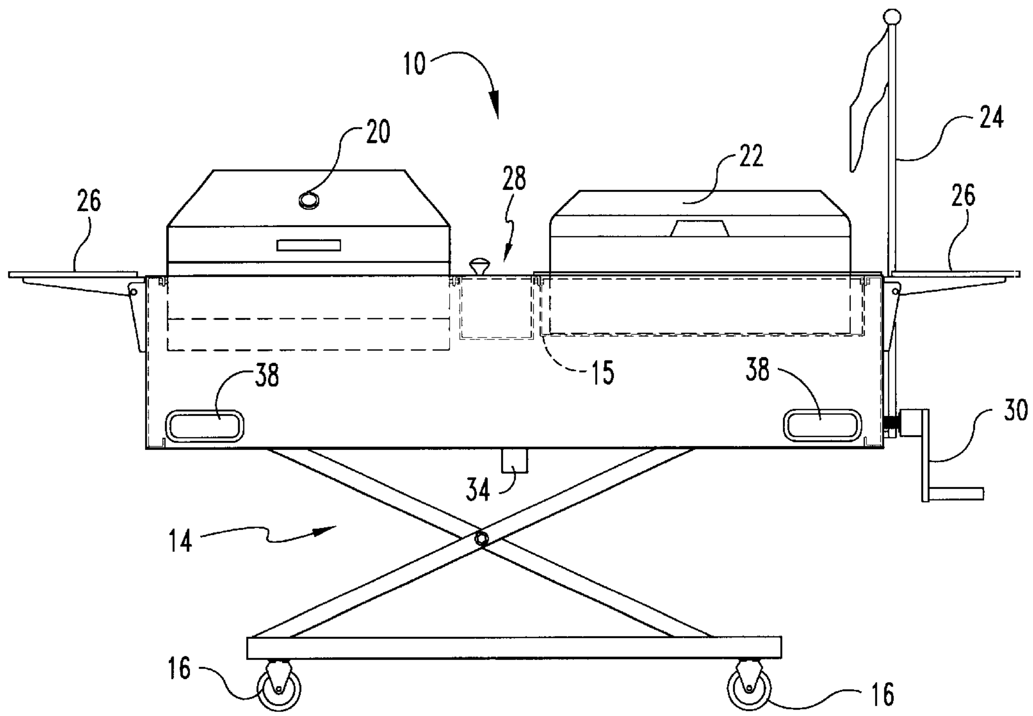
FIG. 3 is a front elevational view of the apparatus of FIG. 1 in the use position.
Figure 5:
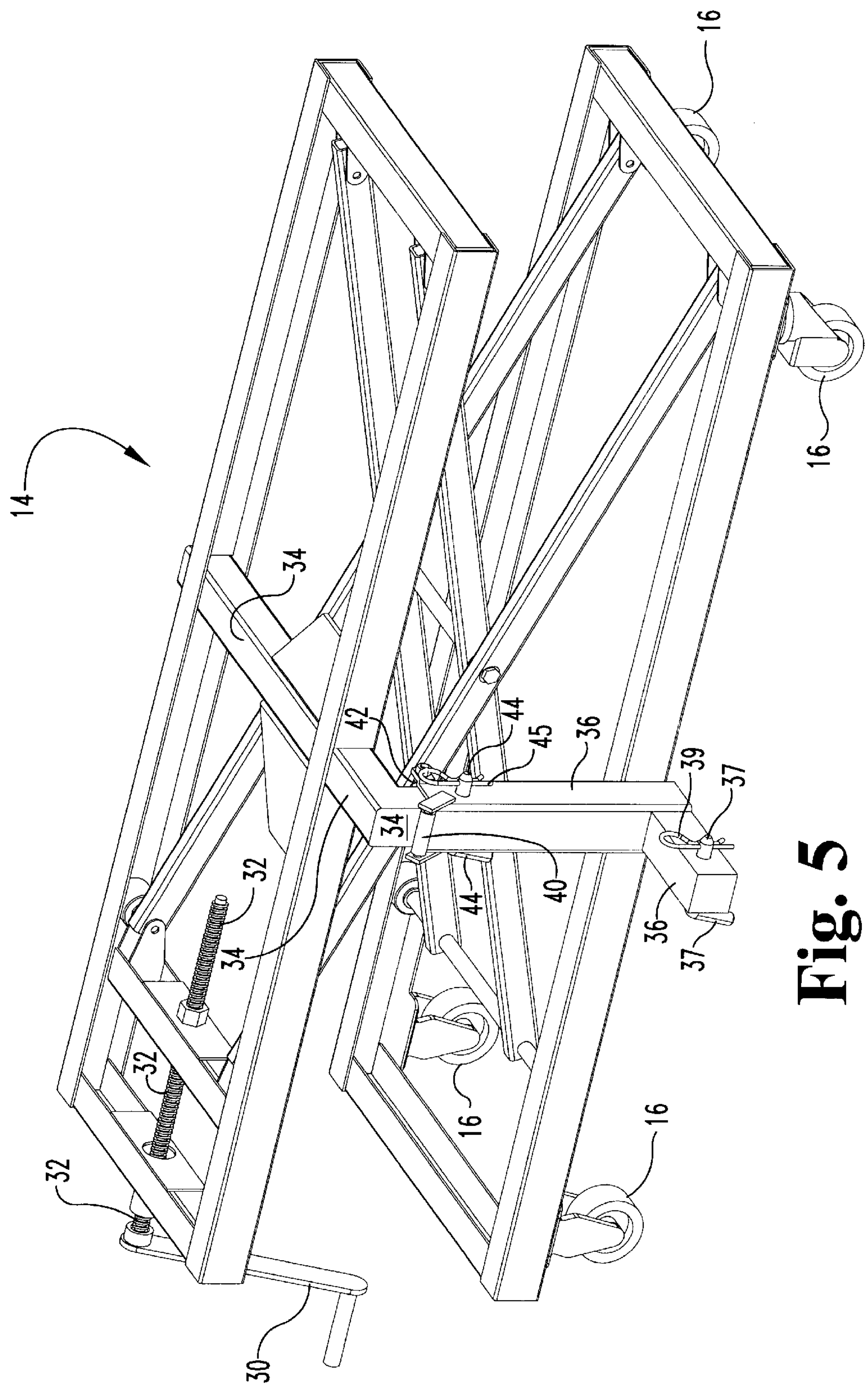
FIG. 5 is perspective view of a preferred embodiment of the scissors lift system of the present invention.
Figure 6:
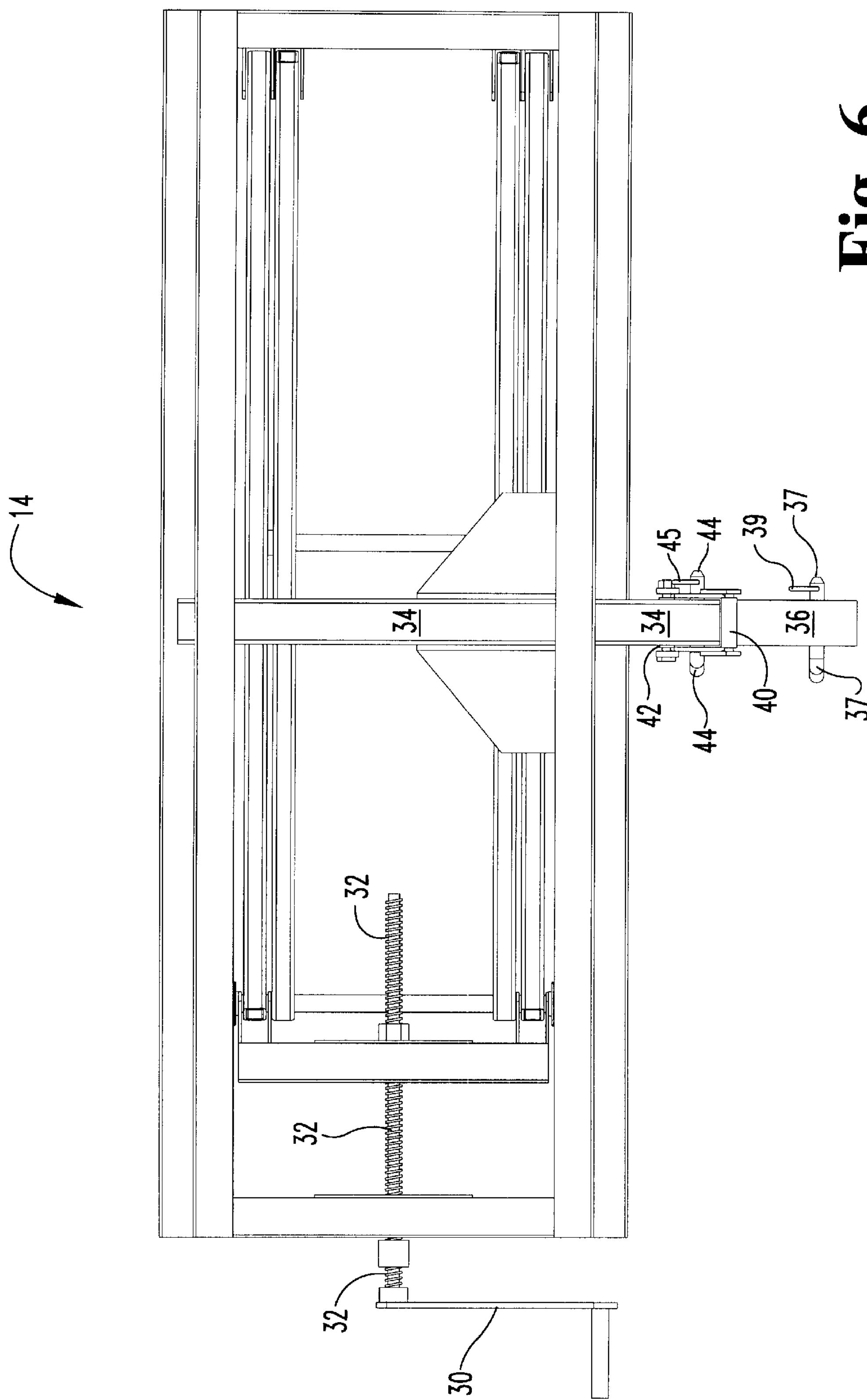
FIG. 6 is a top plan view of the scissors lift system of FIG. 5.
Figure 7:
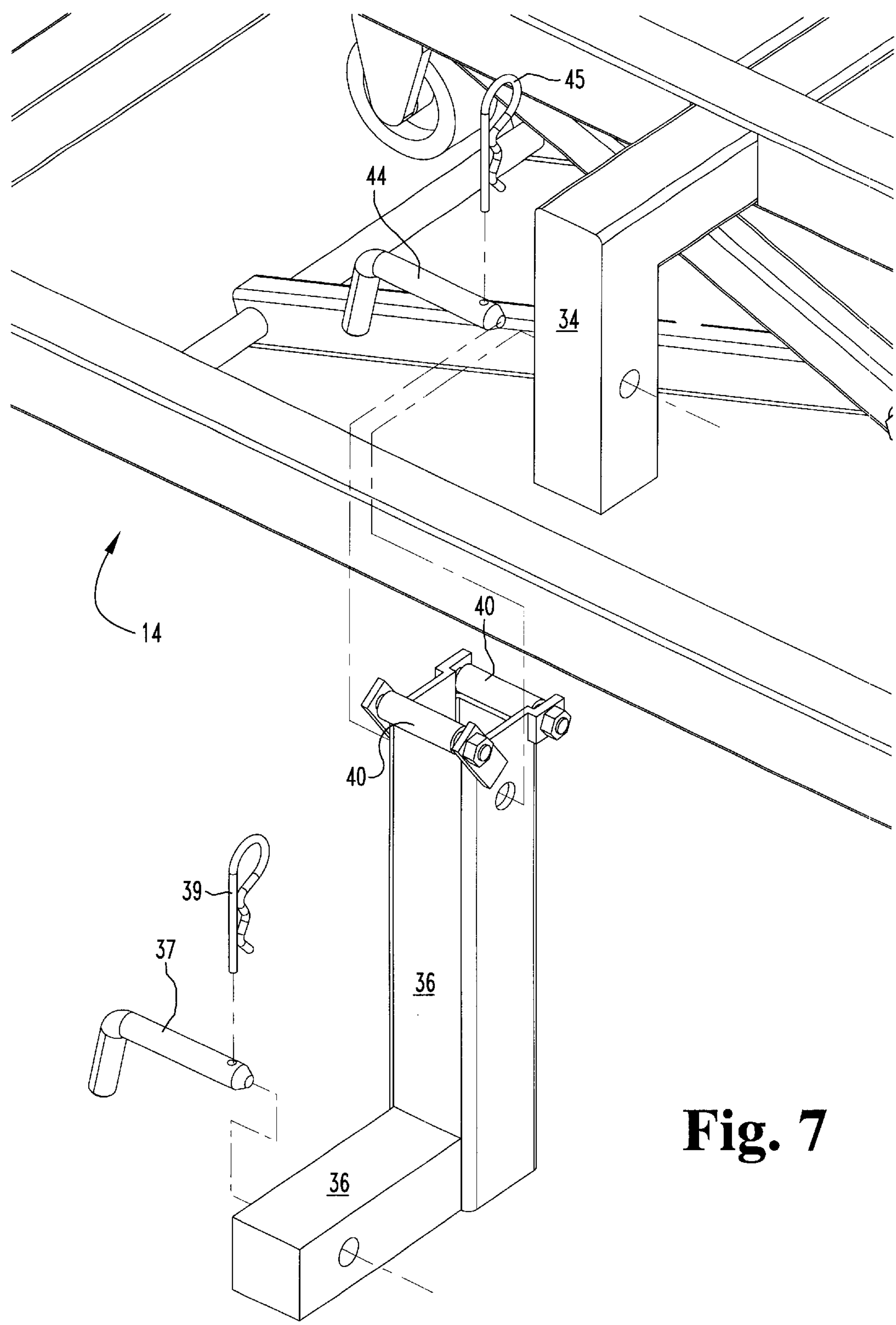
FIG. 7 is perspective view of a preferred embodiment of the rollered receiver hitch of the present invention.

Turning now to the drawings, the portable grill and cooler apparatus 10 of the present invention comprises an all-in-one tailgating package, consisting of a raisable and lowerable platform 12 that houses a removable charcoal or gas grill 20 and a removable cooler chest 22, with a storage compartment 28 between the two, a telescoping flagpole 24 mounted to the platform 12 to display favorable team colors, and a fold down table 26 attached on both ends of the platform 12 to provide more cooking area. The platform 12 is raisable to a use position (FIG. 3) and lowerable to a transport position (FIGS. 1 and 2) in the preferred embodiment to date by a conventional manual scissors lift system 14 (FIGS. 5 and 6) that uses a hand crank 30 to turn a threaded rod 32 that is connected to the scissors arms of the scissors lift system 14 (FIGS. 5 and 6). Attached to the bottom of the scissors lift system 14 are four (4) caster wheels 16 to provide mobility to the apparatus 10 when in the use position (FIG. 3). The wheels 16 play no part in the transport of the apparatus 10 in the use position and mounted to a transport vehicle.

On the backside of the scissors lift system 14 is a 2 inch by 2 inch square hitch tube 34, which is insertable into a novel rollered receiver hitch 36 of the present invention that can be removably inserted into a conventional hitch fitting on a transport vehicle, where the hitch 36 is pinned 37 and locked 39 in place for safety. Since the platform 12 may cover a transport vehicle's taillights when the platform is in the transport position and is attached to a transport vehicle via square hitch tube 34 and rollered receiver hitch 36, two taillights 38 are mounted on the front of the platform 12, with a conventional taillight electrical plug-in being provided at the back of the platform 12 for conventional attachment to the electrical system of a transport vehicle.

The complete portable grill and cooler apparatus 10 is attachable and detachable to a transport vehicle by using the scissors lift system 14. The scissors lift system 14 is raised until square hitch tube 34 is above the height of the rollered receiver hitch 36 when mounted and pinned 37 and locked 39 to a transport vehicle (see FIG. 5). The apparatus 10 is then rolled on wheels 16 into place such that the square hitch tube 34 is over the rollered receiver hitch 36, and then the scissors lift system is lowered into the transport position (FIGS. 1 and 2) with the square hitch tube 34 received within rollered receiver hitch 36 (FIG. 5). Rollers 40, 42 at the top of rollered receiver hitch 36 ease the insertion of square hitch tube 34 of the scissors lift system and prevents the pieces from binding when the apparatus 10 and a transport vehicle are on unleveled ground, for example. When the scissors lift system is fully lowered into the transport position and the square hitch tube 34 has been pinned and locked in place within rollered receiver hitch 36 with conventional hitch pin 44 and lock 45 (FIG. 5), and the taillights 38 have been electrically connected to a transport vehicle's electrical system, the apparatus 10 is transportable by a transport vehicle without further ado. Again, note that the wheels 16 would not be touching the ground. Reversing theses steps would place the apparatus 10 in the use position (FIG. 3), ready for a tailgating party.

Figure 4:
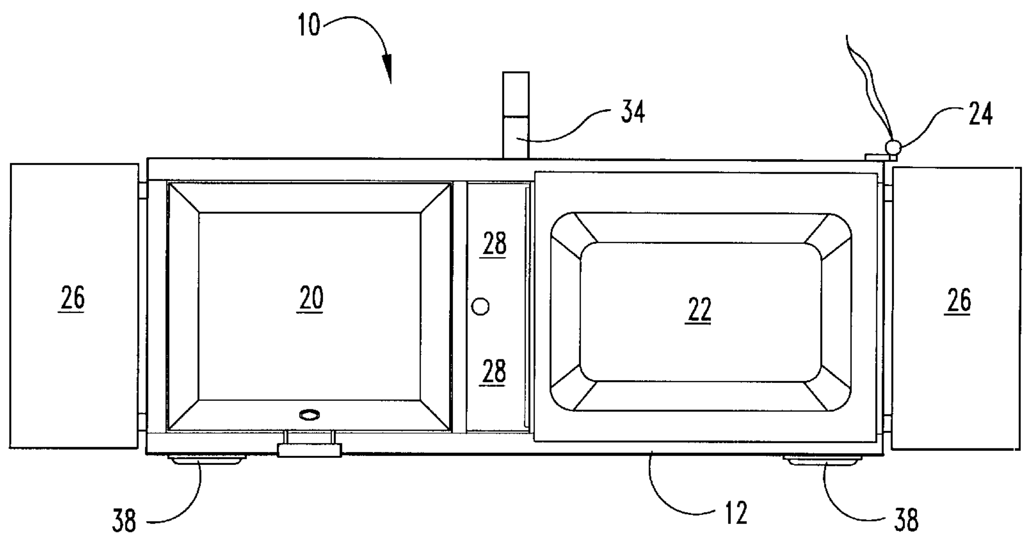
FIG. 4 is a top plan view of the apparatus of FIG. 3.

Being able to provide all of the necessary equipment to tailgate in one easily transportable and easily moveable platform 12 makes the portable grill and cooler apparatus 10 of the present invention a unique product. Everything associated with tailgating is within arms reach. In the preferred embodiment to date, both the grill 20 and the cooler chest 22 are removable from platform 12 so they can be used elsewhere. They fit within correspondingly sized openings in the top of platform 12 (FIG. 4). Grill 20 is removably bolted to platform 12 (FIG. 3) and cooler chest 22 rests upon and is held is place by metal strapping 15 that is attached to platform 12 (FIG. 3).

The flagpole 24 of the preferred embodiment telescopes out to 15 feet. The fold out tables 26 on each end increases preparation space. The box 28 is useful for storing tailgating cooking utensils. The cooler chest 22, grill 20 and storage box 28 are all lockable to prevent vandalism or theft.

Figure 1:
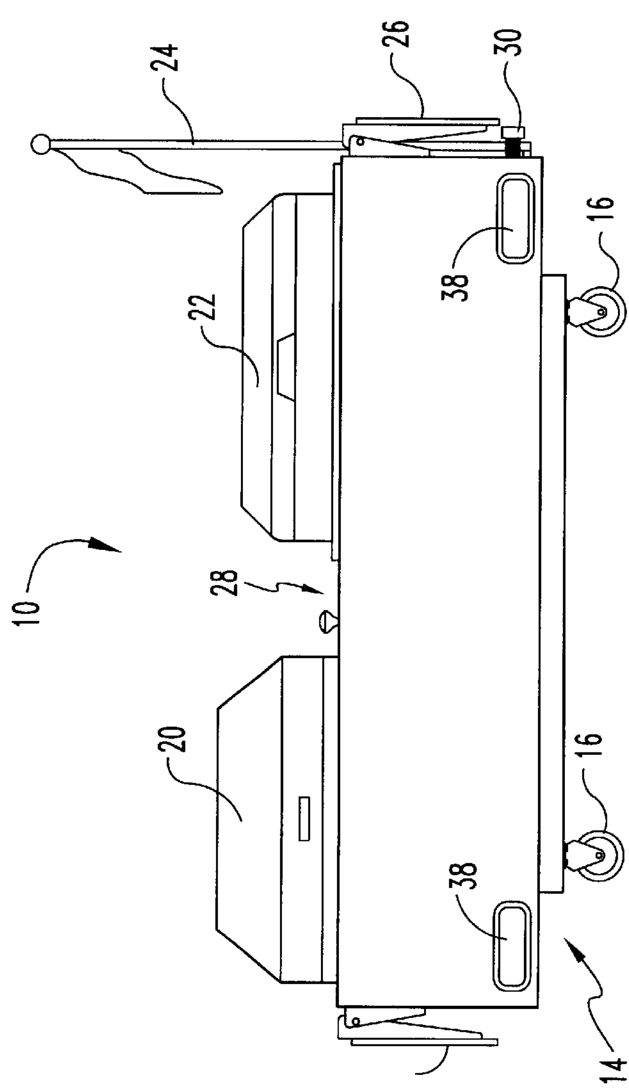
FIG. 1 is a front elevational view of a preferred embodiment of the apparatus of the present invention in the transport position.

The general steps that are necessary to utilize the portable grill and cooler apparatus 10 of the preferred embodiment to date of the present invention may be summarized as follows. Wheel the apparatus 10, appropriately loaded for tailgating, to a transport vehicle. Insert, pin 37 and lock 39 the rollered receiver hitch 36 within the conventional hitch assembly of the transport vehicle. Connect the taillights 38 to the electrical system of the transport vehicle. Wheel the apparatus 10 toward the transport vehicle until square hitch tube 34 is over the rollered receiver hitch 36. Crank down the scissors lift system 14 until the square tube 34 is the appropriate distance within rollered receiver hitch 36 and insert pin 44 and lock 45. Continue to crank the scissors lift system down until the caster wheels 16 are off the ground and all the way up under the platform 12 into the transport position (FIGS. 1 and 2). The apparatus 10 is ready for transportation to the tailgate party site.

For set up at tailgating destination, remove the electrical plug for taillights 38 and crank down the castor wheels 16, utilizing the scissors lift system 14 to ground level. Pull the lock 45 and pin 44 from the rollered receiver hitch 36 and raise the scissors lift systems 14 further until the square hitch tube 34 is free of the rollered receiver hitch 36 and the platform 12 is in the use position. Wheel and position the apparatus 10 on level ground. Raise the telescoping flagpole 24, and lock side tables 26 in place. The apparatus 10 is now in the grilling and chilling mode.

Reload the apparatus 10 after the tailgating event in the reverse sequence and head home in a transport mode.

In the preferred embodiment to date, the scissors lift system 14, fully illustrated in FIGS. 5 and 6, and the platform 12 have been manufactured from mild steel that has been painted with powdered coated paint to prevent rust. The steel for constructing platform 12 has been preferably 20-gauge sheet steel. The preferred plan view (FIG. 4) dimensions of platform 12 have been 64"×24"×18", with an empty weight of the apparatus 10 of about 175 pounds. In the transport position, the preferred height of the apparatus 10 has been about 22" and in the use position about 40". The grill 20 of the preferred embodiment to date has been either a 23"×17" BRINKMAN brand charcoal or gas grill Model King Swivel or propane gas grill. A propane gas grill would require a propane gas source, which to date has been a propane tank hung on a short tubular extension to the top surface of square hitch tube 34. The preferred cooler chest 22 to date has been a 50-quart COLEMAN brand cooler chest. Side tables 26 have been preferably sized at 19"×8".

While the apparatus of the invention has been described above in use with a portable grill and cooler chest, the platform 12 is adaptable for a wide range of uses, from the tailgating uses of the preferred embodiment to hauling camping gear to carrying potable water to farm animals. Many objects can be moved using the apparatus of the present invention without having to use a pull-behind trailer.

I claim:

1. A portable grill and cooler apparatus for attaching to a transport vehicle, comprising:

a grill:

a cooler chest a recessed housing assembly further comprising:

a recessed housing portion having a first recess and a second recess;

a wheeled base portion; and a scissors lift portion extending between the recessed housing portion and the wheeled base portion and adapted to raise the recessed housing portion from a transport position to a use position and lower the recessed housing portion from the use position to the transport position;

a square hitch tube connected to the recessed lifting assembly; and a rollered receiver hitch mountable on the transport vehicle;

wherein the first recess is sized to receive the grill;

wherein the second recess is sized to receive the cooler;

wherein the wheels are spaced from the ground in the transport position;

wherein the square hitch tube is receivable within the rollered receiver hitch that is mountable on a transport vehicle; and wherein the rollered receiver hitch eases insertion of the square hitch tube thereinto to prevent binding on unleveled ground.

2. The portable grill and cooler apparatus of claim 1 wherein the lift means is a scissors lift system.

3. The portable grill and cooler apparatus of claim 1 wherein the grill is a removable charcoal grill and the cooler chest is removable.

4. The portable grill and cooler apparatus of claim 1 wherein the grill is a removable gas grill and the cooler chest is removable.

5. The portable grill and cooler apparatus of claim 1 and further comprising a telescoping flagpole mounted on the platform.

6. The portable grill and cooler apparatus of claim 1 and further comprising a plurality of fold down tables mounted on the platform.

7. The portable grill and cooler apparatus of claim 1 and further comprising a storage compartment in the platform between the grill and the cooler chest.

8. The portable grill and cooler apparatus of claim 1 and further comprising taillight means mounted to the platform to functionally replace the taillights of a transport vehicle to which the platform has been attached.

9. A tailgating assembly that may be connected to and carried by a vehicle, comprising:

a grill;

a cooler chest;

a recessed platform having a first recess and a second recess;

a wheeled base;

a lift system interposed between the base and the recessed platform for moving the wheeled base relative to the platform between a transport position and a use position;

a square male hitch tube connected to the lift system; and a rollered square female receiver hitch mountable on the vehicle;

wherein the first recess is sized to receive the grill;

wherein the second recess is sized to receive the cooler;

wherein the wheeled base is spaced from the ground in the transport position;

wherein the square male hitch tube is receivable within the rollered receiver hitch; and wherein the rollered receiver hitch eases insertion of the square hitch tube thereinto on unlevel ground.

10. The tailgating assembly of claim 9 wherein the grill is removably bolted to the recessed platform and wherein the cooler is strapped to the recessed platform.

11. The tailgating assembly of claim 9 further comprising a telescoping flagpole connected to the recessed platform.

12. The tailgating assembly of claim 9 further comprising at least one fold down table connected to the recessed platform.

13. The tailgating assembly of claim 9 further comprising a storage compartment formed in the recessed platform and positioned between the grill and the cooler.

14. The tailgating assembly of claim 9 further comprising taillights connected to the platform, wherein the taillights are electrically connectable to the vehicle.

15. A method for providing a tailgating party, comprising the steps of:

a) wheeling an appropriately loaded portable grill and cooler apparatus to a transport vehicle, wherein the portable grill and cooler apparatus further comprises:

a recessed platform having a first recess and a second recess;

a grill occupying the first recess;

a cooler occupying the second recess;

a lift system coupled to the platform for moving the platform between a transport position and a use position;

a square male hitch tube attached to the lift system; and caster wheels attached to the lift system;

b) locking a rollered receiver hitch to the transport vehicle;

c) connecting the taillights to the electrical system of the transport vehicle;

d) aligning square hitch tube with rollered receiver hitch;

e) lowering the lift system to insert the square tube into the rollered receiver hitch;

f) locking the square tube into the rollered receiver hitch;

g) raising the wheels off the ground; and h) transporting the grill and cooler apparatus to a tailgate party site.

16. The method of claim 15 further comprising the steps of:

i) disconnecting the taillights from the electrical system of the transport vehicle;

j) lowering the wheels to the ground;

k) unlocking the square tube from the rollered receiver hitch;

l) raising the lift system such that the platform is raised to a desired use height; and m) wheeling the grill and cooler apparatus to a desired location.

17. The method of claim 16 further comprising the steps of:

n) deploying at least one side table; and o) raising a flag.

18. The method of claim 16 further comprising the steps of:

p) wheeling the grill and cooler system to the transport vehicle;

q) reconnecting the taillights to the electrical system of the transport vehicle;

r) aligning the square hitch tube with rollered receiver hitch;

s) lowering the lift system to insert the square tube into the rollered receiver hitch;

t) locking the square tube into the rollered receiver hitch;

u) raising the wheels off the ground; and v) transporting the grill and cooler apparatus away from the tailgate party site.

* * * * *